(12) United States Patent
Mandelbaum et al.

(10) Patent No.: US 11,531,810 B2
(45) Date of Patent: *Dec. 20, 2022

(54) SYSTEMS AND METHODS FOR COMPARING DOCUMENTS

(71) Applicant: Intellicheck, Inc., Melville, NY (US)

(72) Inventors: Frank Mandelbaum, Melville, NY (US); Russell T. Embry, Melville, NY (US)

(73) Assignee: Intellicheck, Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,969

(22) Filed: Apr. 2, 2020

(65) Prior Publication Data

US 2020/0234039 A1    Jul. 23, 2020

Related U.S. Application Data

(63) Continuation of application No. 16/149,067, filed on Oct. 1, 2018, now Pat. No. 10,643,068, which is a
(Continued)

(51) Int. Cl.
*G06F 40/194* (2020.01)
*G06Q 10/10* (2012.01)
(Continued)

(52) U.S. Cl.
CPC .......... *G06F 40/194* (2020.01); *G06Q 10/10* (2013.01); *G06Q 30/0225* (2013.01);
(Continued)

(58) Field of Classification Search
CPC .............. G06F 40/194; G06K 9/00469; G06K 9/00483; G06Q 10/10; G06Q 30/0225; G06Q 30/0236
(Continued)

(56) References Cited

U.S. PATENT DOCUMENTS

| | | |
|---|---|---|
| 3,569,619 A | 3/1971 | Simjian et al. |
| 3,636,318 A | 1/1972 | Lindstrom et al. |

(Continued)

FOREIGN PATENT DOCUMENTS

| | | |
|---|---|---|
| DE | 2802430 A1 | 7/1978 |
| DE | 3050473 C2 | 9/1986 |

(Continued)

OTHER PUBLICATIONS

"Natural Language Understanding Through Fuzzy Logic Interference And Its Application To Speech Recognition" (2002) Jiping Sun, Fakhri Karray, Otman Basir & Mohamed Kamel.
(Continued)

*Primary Examiner* — Ali Bayat
(74) *Attorney, Agent, or Firm* — Greenberg Traurig

(57) ABSTRACT

The present invention relates to a system and a method for comparing information contained on at least two documents belonging to an entity. The present invention includes at least one device configured to receive information from at least one first document and at least one second document; then, compare at least one first document information and at least one second document information; and determine whether at least one second document contains at least one first document information. The present invention then outputs a result of whether the at least one second document contains at least one first document information.

19 Claims, 8 Drawing Sheets

Related U.S. Application Data continuation of application No. 15/343,583, filed on Nov. 4, 2016, now Pat. No. 10,127,443, which is a continuation of application No. 14/606,468, filed on Jan. 27, 2015, now Pat. No. 9,489,573, which is a continuation of application No. 14/256,260, filed on Apr. 18, 2014, now Pat. No. 8,942,432, which is a continuation of application No. 14/011,512, filed on Aug. 27, 2013, now Pat. No. 8,705,807, which is a continuation of application No. 13/411,117, filed on Mar. 2, 2012, now Pat. No. 8,520,957, which is a continuation of application No. 12/944,615, filed on Nov. 11, 2010, now Pat. No. 8,139,869, which is a continuation of application No. 10/984,703, filed on Nov. 9, 2004, now Pat. No. 7,860,318.

(51) Int. Cl.
*G06Q 30/02* (2012.01)
*G06V 30/416* (2022.01)
*G06V 30/418* (2022.01)

(52) U.S. Cl.
CPC ........ *G06Q 30/0236* (2013.01); *G06V 30/416* (2022.01); *G06V 30/418* (2022.01)

(58) Field of Classification Search
USPC .......................................................... 382/115
See application file for complete search history.

(56) References Cited

U.S. PATENT DOCUMENTS

| | | |
|---|---|---|
| 3,702,392 A | 11/1972 | St. Jean |
| 3,868,057 A | 2/1975 | Chavez |
| 3,906,201 A | 9/1975 | Housman et al. |
| 3,956,615 A | 5/1976 | Anderson et al. |
| 3,988,570 A | 10/1976 | Murphy et al. |
| 4,138,057 A | 2/1979 | Atalla |
| 4,180,207 A | 12/1979 | Lee |
| 4,186,871 A | 2/1980 | Anderson et al. |
| 4,193,131 A | 3/1980 | Lennon et al. |
| RE30,579 E | 4/1981 | Goldman et al. |
| 4,304,961 A | 12/1981 | Campbell, Jr. |
| 4,357,529 A | 11/1982 | Atalla |
| 4,369,361 A | 1/1983 | Swartz et al. |
| 4,450,348 A | 5/1984 | Stockburger et al. |
| 4,453,074 A | 6/1984 | Weinstein |
| 4,471,216 A | 9/1984 | Herve |
| 4,506,148 A | 3/1985 | Berthold et al. |
| 4,575,816 A | 3/1986 | Hendrickson et al. |
| 4,629,872 A | 12/1986 | Hallberg |
| 4,634,846 A | 1/1987 | Harvey et al. |
| 4,639,889 A | 1/1987 | Matsumoto et al. |
| 4,656,473 A | 4/1987 | Goldman et al. |
| 4,659,914 A | 4/1987 | Kondo et al. |
| 4,689,477 A | 8/1987 | Goldman |
| 4,752,676 A | 6/1988 | Leonard et al. |
| 4,807,287 A | 2/1989 | Tucker et al. |
| 4,811,393 A | 3/1989 | Hazard |
| 4,811,408 A | 3/1989 | Goldman |
| 4,812,628 A | 3/1989 | Boston et al. |
| 4,816,655 A | 3/1989 | Musyck et al. |
| 4,816,657 A | 3/1989 | Stockburger et al. |
| 4,879,747 A | 11/1989 | Leighton |
| 4,906,988 A | 3/1990 | Copella |
| 4,972,476 A | 11/1990 | Nathans |
| 4,981,370 A | 1/1991 | Dziewit et al. |
| 4,982,072 A | 1/1991 | Takigami |
| 4,993,068 A | 2/1991 | Piosenka et al. |
| 4,995,081 A | 2/1991 | Leighton et al. |
| 5,001,752 A | 3/1991 | Fischer |
| 5,007,089 A | 4/1991 | Matyas et al. |
| 5,012,077 A | 4/1991 | Takano |
| 5,016,192 A | 5/1991 | Ishido et al. |
| 5,030,117 A | 7/1991 | Delorme |
| 5,054,077 A | 10/1991 | Suzuki |
| 5,055,658 A | 10/1991 | Cockburn |
| 5,136,643 A | 8/1992 | Fischer |
| 5,140,634 A | 8/1992 | Guidon et al. |
| 5,163,098 A | 11/1992 | Dabhura |
| 5,172,785 A | 12/1992 | Takahashi |
| 5,199,074 A | 3/1993 | Thor |
| 5,214,699 A | 5/1993 | Monroe et al. |
| 5,222,152 A | 6/1993 | Fishbine et al. |
| 5,237,611 A | 8/1993 | Rasmussen et al. |
| 5,241,600 A | 8/1993 | Hillis |
| 5,249,227 A | 9/1993 | Bergum et al. |
| 5,259,025 A | 11/1993 | Monroe et al. |
| 5,267,315 A | 11/1993 | Narita et al. |
| 5,280,527 A | 1/1994 | Gullman et al. |
| 5,284,364 A | 2/1994 | Jain |
| 5,287,181 A | 2/1994 | Holman |
| 5,321,751 A | 6/1994 | Ray et al. |
| 5,336,871 A | 8/1994 | Colgate, Jr. |
| 5,337,358 A | 8/1994 | Axelrod |
| 5,337,361 A | 8/1994 | Wang et al. |
| 5,341,428 A | 8/1994 | Schatz |
| 5,347,589 A | 9/1994 | Meeks et al. |
| 5,367,148 A | 11/1994 | Storch et al. |
| 5,367,581 A | 11/1994 | Abel |
| 5,420,924 A | 5/1995 | Berson et al. |
| 5,422,468 A | 6/1995 | Abecassis |
| 5,429,361 A | 7/1995 | Raven et al. |
| 5,432,864 A | 7/1995 | Lu et al. |
| 5,446,273 A | 8/1995 | Leslie |
| 5,446,885 A | 8/1995 | Moore et al. |
| 5,453,600 A | 9/1995 | Swartz |
| 5,461,217 A | 10/1995 | Claus |
| 5,469,506 A | 11/1995 | Berson et al. |
| 5,471,533 A | 11/1995 | Wang et al. |
| 5,475,585 A | 12/1995 | Bush |
| 5,490,217 A | 2/1996 | Wang et al. |
| 5,500,518 A | 3/1996 | Olzak et al. |
| 5,506,395 A | 4/1996 | Eppley |
| 5,513,019 A | 4/1996 | Cueli |
| 5,513,261 A | 4/1996 | Maher |
| 5,513,272 A | 4/1996 | Bogosian, Jr. |
| 5,514,860 A | 5/1996 | Berson |
| 5,546,278 A | 8/1996 | Bethurum |
| 5,553,143 A | 9/1996 | Ross |
| 5,559,885 A | 9/1996 | Drexler et al. |
| 5,590,193 A | 12/1996 | Le Roux |
| 5,594,226 A | 1/1997 | Steger |
| 5,594,806 A | 1/1997 | Colbert |
| 5,598,474 A | 1/1997 | Johnson |
| 5,610,993 A | 3/1997 | Yamamoto |
| 5,621,200 A | 4/1997 | Irwin, Jr. et al. |
| 5,630,127 A | 5/1997 | Moore et al. |
| 5,635,981 A | 6/1997 | Ribacoff |
| 5,642,485 A | 6/1997 | Deaton |
| 5,651,066 A | 7/1997 | Moriyasu et al. |
| 5,661,805 A | 8/1997 | Miyauchi |
| 5,663,553 A | 9/1997 | Aucsmith |
| 5,668,874 A | 9/1997 | Kristol et al. |
| 5,679,940 A | 10/1997 | Templeton et al. |
| 5,694,471 A | 12/1997 | Chen et al. |
| 5,695,835 A | 12/1997 | Weber et al. |
| 5,706,507 A | 1/1998 | Schloss |
| 5,712,472 A | 1/1998 | Lee |
| 5,717,776 A | 2/1998 | Watanabe |
| 5,719,939 A | 2/1998 | Tel |
| 5,721,777 A | 2/1998 | Blaze |
| 5,722,526 A | 3/1998 | Sharrard |
| 5,742,685 A | 4/1998 | Berson et al. |
| D393,950 S | 5/1998 | Lockhart |
| 5,748,908 A | 5/1998 | Yu |
| 5,754,939 A | 5/1998 | Herz et al. |
| 5,770,084 A | 6/1998 | Novis et al. |
| 5,770,849 A | 6/1998 | Novis et al. |
| 5,781,650 A | 7/1998 | Lobo et al. |
| 5,786,587 A | 7/1998 | Colgate, Jr. |
| 5,805,849 A | 9/1998 | Jordan et al. |
| 5,812,664 A | 9/1998 | Bernobitch et al. |

(56) References Cited

U.S. PATENT DOCUMENTS

| | | |
|---|---|---|
| 5,838,812 A | 11/1998 | Pare et al. |
| 5,848,426 A | 12/1998 | Wang et al. |
| 5,862,247 A | 1/1999 | Fisun et al. |
| 5,864,622 A | 1/1999 | Marcus |
| 5,864,623 A | 1/1999 | Messina et al. |
| 5,870,723 A | 2/1999 | Pare, Jr. et al. |
| 5,966,654 A | 10/1999 | Croughwell et al. |
| 5,988,497 A | 11/1999 | Wallace |
| 5,991,429 A | 11/1999 | Coffin et al. |
| 5,995,014 A | 11/1999 | DiMaria |
| 6,038,666 A | 3/2000 | Hsu et al. |
| 6,070,147 A | 5/2000 | Harms et al. |
| 6,075,455 A | 6/2000 | DiMaria et al. |
| 6,089,452 A | 7/2000 | Rhode, III |
| 6,104,809 A | 8/2000 | Berson et al. |
| 6,119,932 A | 9/2000 | Maloney et al. |
| 6,119,933 A | 9/2000 | Wong et al. |
| 6,135,355 A | 10/2000 | Han et al. |
| 6,138,914 A | 10/2000 | Campo et al. |
| 6,148,091 A | 11/2000 | DiMaria |
| 6,169,542 B1 | 1/2001 | Hooks et al. |
| 6,171,138 B1 | 1/2001 | Lefebvre et al. |
| 6,182,221 B1 | 1/2001 | Hsu et al. |
| 6,196,460 B1 | 3/2001 | Shin |
| 6,199,079 B1 | 3/2001 | Gupta et al. |
| 6,202,055 B1 | 3/2001 | Houvener et al. |
| 6,222,463 B1 | 4/2001 | Rai |
| 6,224,109 B1 | 5/2001 | Yang |
| 6,234,389 B1 | 5/2001 | Valliani et al. |
| 6,263,447 B1 | 7/2001 | French et al. |
| 6,289,113 B1 | 9/2001 | McHugh et al. |
| 6,317,544 B1 | 11/2001 | Diehl et al. |
| 6,354,506 B1 | 3/2002 | Han et al. |
| 6,363,387 B1 | 3/2002 | Ponnekanti et al. |
| 6,386,451 B1 | 5/2002 | Sehr |
| 6,442,532 B1 | 8/2002 | Kawan |
| 6,460,185 B1 | 10/2002 | Hardy |
| 6,463,416 B1 | 10/2002 | Messina |
| 6,475,146 B1 | 11/2002 | Frelburger et al. |
| 6,484,260 B1 | 11/2002 | Scott et al. |
| 6,499,141 B1 | 12/2002 | Egnew |
| 6,523,741 B1 | 2/2003 | DiMaria et al. |
| 6,542,635 B1 | 4/2003 | Hu et al. |
| 6,557,752 B1 | 5/2003 | Yacoob |
| 6,564,997 B1 | 5/2003 | Juds |
| 6,565,000 B2 | 5/2003 | Sehr |
| 6,587,032 B2 | 7/2003 | Armingaud |
| 6,592,029 B2 | 7/2003 | Brikho |
| 6,609,659 B2 | 8/2003 | Sehr |
| 6,612,958 B2 | 9/2003 | Imai et al. |
| 6,615,263 B2 | 9/2003 | Dulai et al. |
| 6,624,739 B1 | 9/2003 | Stobbe |
| 6,651,217 B1 | 11/2003 | Kennedy et al. |
| 6,679,425 B1 | 1/2004 | Sheppard et al. |
| 6,736,317 B1 | 5/2004 | McDonald et al. |
| 6,736,322 B2 | 5/2004 | Gobburu et al. |
| 6,745,937 B2 | 6/2004 | Walsh et al. |
| 6,754,910 B2 | 6/2004 | Shultz et al. |
| 6,758,394 B2 | 7/2004 | Maskatiya et al. |
| 6,760,463 B2 | 7/2004 | Rhoads |
| 6,779,721 B2 | 8/2004 | Larson et al. |
| 6,785,405 B2 | 8/2004 | Tuttle et al. |
| 6,808,109 B2 | 10/2004 | Page |
| 6,820,984 B2 | 11/2004 | Furuhata |
| 6,854,642 B2 | 2/2005 | Metcalf et al. |
| 6,910,223 B2 | 6/2005 | Egnew |
| 6,914,517 B2 | 7/2005 | Kinsella |
| 6,920,437 B2 | 7/2005 | Messina |
| 6,928,546 B1 | 8/2005 | Nanavati et al. |
| 6,934,861 B2 | 8/2005 | Haala |
| 6,944,782 B2 | 9/2005 | von Mueller et al. |
| 6,956,615 B2 | 10/2005 | Nakagishi et al. |
| 6,970,088 B2 | 11/2005 | Kovach |
| 6,991,159 B2 | 1/2006 | Zenou |
| 7,003,669 B2 | 2/2006 | Monk |
| 7,027,931 B1 | 4/2006 | Jones et al. |
| 7,035,626 B1 | 4/2006 | Luciano, Jr. |
| 7,059,516 B2 | 6/2006 | Matsuyama et al. |
| 7,072,081 B2 | 7/2006 | Johnson et al. |
| 7,110,573 B2 | 9/2006 | Monk et al. |
| 7,117,228 B2 | 10/2006 | Tomita et al. |
| 7,118,033 B2 | 10/2006 | Merkert |
| 7,119,553 B2 | 10/2006 | Yang et al. |
| 7,119,674 B2 | 10/2006 | Sefton |
| 7,147,155 B2 | 12/2006 | Weekes |
| 7,161,465 B2 | 1/2007 | Wood et al. |
| 7,185,808 B2 | 3/2007 | Mitsumoto |
| 7,212,113 B2 | 5/2007 | Zanovitch |
| 7,212,279 B1 | 5/2007 | Feng |
| 7,244,043 B2 | 7/2007 | Monk et al. |
| 7,277,891 B2 | 10/2007 | Howard et al. |
| 7,280,030 B1 | 10/2007 | Monaco |
| 7,284,698 B2 | 10/2007 | Sogo |
| 7,299,408 B1 | 11/2007 | Daconta |
| 7,309,010 B2 | 12/2007 | Stopperan et al. |
| 7,309,012 B2 | 12/2007 | von Mueller et al. |
| 7,313,825 B2 | 12/2007 | Redlich et al. |
| 7,349,987 B2 | 3/2008 | Redlich et al. |
| 7,362,210 B2 | 4/2008 | Bazakos et al. |
| 7,382,261 B2 | 6/2008 | Lin et al. |
| 7,382,911 B1 | 6/2008 | Meier et al. |
| 7,392,944 B2 | 7/2008 | Shieh |
| 7,466,223 B2 | 12/2008 | Sefton |
| 7,478,067 B2 | 1/2009 | Messina |
| 7,484,088 B2 | 1/2009 | Campbell et al. |
| 7,492,256 B2 | 2/2009 | Eren et al. |
| 7,494,060 B2 | 2/2009 | Zagami |
| 7,500,178 B1 | 3/2009 | O'Donnell |
| 7,526,645 B2 | 4/2009 | Miyazaki et al. |
| 7,554,446 B2 | 6/2009 | Ciarcia et al. |
| 7,568,108 B2 | 7/2009 | Monaco et al. |
| 7,587,368 B2 | 9/2009 | Felsher |
| 7,599,847 B2 | 10/2009 | Block et al. |
| 7,631,805 B2 | 12/2009 | Larson et al. |
| 7,639,846 B2 | 12/2009 | Yoda |
| 7,685,629 B1 | 3/2010 | White et al. |
| 7,708,189 B1 | 5/2010 | Cipriano |
| 7,716,240 B2 | 5/2010 | Lim |
| 7,739,744 B2 | 6/2010 | Burch et al. |
| 7,802,305 B1 | 9/2010 | Leeds |
| 7,817,013 B2 | 10/2010 | Bazakos et al. |
| 7,821,391 B2 | 10/2010 | Gupta et al. |
| 7,844,545 B2 | 11/2010 | Michelsen |
| 7,860,318 B2 | 12/2010 | Mandelbaum et al. |
| 7,895,611 B2 | 2/2011 | Grabarnik et al. |
| 7,898,385 B2 | 3/2011 | Kocher |
| 7,899,751 B2 | 3/2011 | Messina |
| 7,925,887 B2 | 4/2011 | Burton |
| 8,009,013 B1 | 8/2011 | Hirschfeld et al. |
| 8,019,691 B2 | 9/2011 | Dominguez et al. |
| 8,023,140 B2 * | 9/2011 | Lapstun ............ H04N 21/422 358/1.15 |
| 8,036,431 B1 | 10/2011 | Fisher et al. |
| 8,083,130 B1 | 12/2011 | Cipriano |
| 8,086,525 B2 | 12/2011 | Atwood et al. |
| 8,090,388 B1 | 1/2012 | Opitz |
| 8,139,869 B2 | 3/2012 | Mandelbaum |
| 8,220,047 B1 | 7/2012 | Soghoian et al. |
| 8,235,287 B2 | 8/2012 | McKelvey |
| 8,286,875 B2 | 10/2012 | Tang et al. |
| 8,294,554 B2 | 10/2012 | Shoarinejad et al. |
| 8,322,605 B2 | 12/2012 | Ludlow et al. |
| 8,517,254 B1 | 8/2013 | Cipriano |
| 8,520,957 B2 | 8/2013 | Mandelbaum et al. |
| 8,616,446 B2 | 12/2013 | Ludlow et al. |
| 8,771,085 B1 | 7/2014 | Clyde et al. |
| 8,960,541 B2 | 2/2015 | Ludlow |
| 8,964,211 B2 | 2/2015 | Koga |
| 9,069,982 B2 | 6/2015 | Coles et al. |
| 9,245,157 B1 | 1/2016 | Cipriano |
| 9,697,667 B1 | 7/2017 | Cipriano |
| 2001/0027439 A1 | 10/2001 | Holtzman et al. |
| 2001/0034222 A1 | 10/2001 | Roustaei et al. |
| 2001/0041581 A1 | 11/2001 | Hansson |

(56) References Cited

U.S. PATENT DOCUMENTS

| | | |
|---|---|---|
| 2002/0001393 A1 | 1/2002 | Jones et al. |
| 2002/0002507 A1 | 1/2002 | Hatakeyama |
| 2002/0010679 A1 | 1/2002 | Felsher |
| 2002/0025796 A1 | 2/2002 | Taylor et al. |
| 2002/0046185 A1 | 4/2002 | Villart et al. |
| 2002/0052193 A1 | 5/2002 | Chetty |
| 2002/0056747 A1 | 5/2002 | Matsuyama et al. |
| 2002/0087478 A1 | 7/2002 | Hudd et al. |
| 2002/0089410 A1 | 7/2002 | Janiak et al. |
| 2002/0095389 A1* | 7/2002 | Gaines .............. G06Q 20/3674 705/67 |
| 2002/0100802 A1 | 8/2002 | Sehr |
| 2002/0100803 A1 | 8/2002 | Sehr |
| 2002/0134837 A1 | 9/2002 | Kishon |
| 2002/0143571 A1 | 10/2002 | Messina |
| 2002/0156676 A1 | 10/2002 | Ahrens et al. |
| 2003/0048904 A1 | 3/2003 | Wang et al. |
| 2003/0055689 A1 | 3/2003 | Block et al. |
| 2003/0057276 A1 | 3/2003 | Appalucci et al. |
| 2003/0070077 A1 | 4/2003 | Redlich et al. |
| 2003/0071730 A1 | 4/2003 | Valbh |
| 2003/0078069 A1 | 4/2003 | Lindeman |
| 2003/0099379 A1 | 5/2003 | Monk et al. |
| 2003/0115459 A1 | 6/2003 | Monk |
| 2003/0120653 A1* | 6/2003 | Brady ................... G06F 16/951 |
| 2003/0126092 A1 | 7/2003 | Chihara |
| 2003/0143990 A1 | 7/2003 | Minear et al. |
| 2003/0152250 A1 | 8/2003 | Pewzner |
| 2003/0154138 A1 | 8/2003 | Phillips et al. |
| 2003/0177102 A1 | 9/2003 | Robinson |
| 2003/0182435 A1 | 9/2003 | Redlich et al. |
| 2003/0218066 A1 | 11/2003 | Fernandes et al. |
| 2003/0220835 A1* | 11/2003 | Barnes, Jr. ............ H04M 1/724 705/14.36 |
| 2003/0225687 A1 | 12/2003 | Lawrence |
| 2004/0002894 A1 | 1/2004 | Kocher |
| 2004/0010472 A1 | 1/2004 | Hilby et al. |
| 2004/0034666 A1 | 2/2004 | Chen |
| 2004/0049401 A1 | 3/2004 | Carr et al. |
| 2004/0059688 A1 | 3/2004 | Dominguez et al. |
| 2004/0068693 A1 | 4/2004 | Rawat et al. |
| 2004/0078335 A1 | 4/2004 | Calvesio et al. |
| 2004/0080504 A1 | 4/2004 | Salesky |
| 2004/0081332 A1 | 4/2004 | Tuttle et al. |
| 2004/0083091 A1* | 4/2004 | Ie ........................ G06F 40/284 704/9 |
| 2004/0104268 A1 | 6/2004 | Bailey |
| 2004/0117060 A1 | 6/2004 | Stopperan et al. |
| 2004/0117624 A1 | 6/2004 | Brandt et al. |
| 2004/0124982 A1 | 7/2004 | Kovach |
| 2004/0153408 A1 | 8/2004 | Jones et al. |
| 2004/0162984 A1* | 8/2004 | Freeman ................ G07C 9/253 713/175 |
| 2004/0205466 A1 | 10/2004 | Kuppinger et al. |
| 2004/0215557 A1 | 10/2004 | Michelsen |
| 2004/0233036 A1 | 11/2004 | Sefton |
| 2004/0250142 A1 | 12/2004 | Feyler |
| 2004/0254895 A1 | 12/2004 | Kumagaya et al. |
| 2005/0039014 A1 | 2/2005 | Sajkowsky |
| 2005/0072846 A1* | 4/2005 | Lubow ............. G06K 19/06028 235/462.01 |
| 2005/0076013 A1 | 4/2005 | Hilbert |
| 2005/0080649 A1 | 4/2005 | Alvarez et al. |
| 2005/0082365 A1 | 4/2005 | Merkert |
| 2005/0093675 A1 | 5/2005 | Wood et al. |
| 2005/0131829 A1 | 6/2005 | Messina |
| 2005/0137987 A1 | 6/2005 | May et al. |
| 2005/0171787 A1 | 8/2005 | Zagami |
| 2005/0187677 A1 | 8/2005 | Walker |
| 2005/0205668 A1 | 9/2005 | Sogo |
| 2005/0209955 A1 | 9/2005 | Underwood et al. |
| 2005/0212654 A1 | 9/2005 | Yoda |
| 2005/0216953 A1 | 9/2005 | Ellingson |
| 2005/0241003 A1 | 10/2005 | Sweeney et al. |
| 2005/0242172 A1 | 11/2005 | Murata |
| 2005/0247787 A1 | 11/2005 | Von Mueller et al. |
| 2005/0248450 A1 | 11/2005 | Zanovitch |
| 2005/0258234 A1 | 11/2005 | Silverbrook et al. |
| 2005/0273453 A1 | 12/2005 | Holloran |
| 2005/0284931 A1 | 12/2005 | Adams et al. |
| 2006/0004812 A1 | 1/2006 | Blackwell et al. |
| 2006/0049255 A1 | 3/2006 | Mueller et al. |
| 2006/0075228 A1 | 4/2006 | Black et al. |
| 2006/0080541 A1 | 4/2006 | Monaco et al. |
| 2006/0102717 A1 | 5/2006 | Wood et al. |
| 2006/0151607 A1 | 7/2006 | Horikiri et al. |
| 2006/0157559 A1 | 7/2006 | Levy et al. |
| 2006/0176062 A1 | 8/2006 | Yang et al. |
| 2006/0184575 A1 | 8/2006 | Singleton |
| 2006/0186994 A1 | 8/2006 | Lin et al. |
| 2006/0231610 A1 | 10/2006 | Cheng |
| 2006/0237529 A1 | 10/2006 | Kelley et al. |
| 2006/0243799 A1 | 11/2006 | Kelly et al. |
| 2007/0046424 A1 | 3/2007 | Davis et al. |
| 2007/0069921 A1 | 3/2007 | Sefton |
| 2007/0085684 A1 | 4/2007 | Ciarcia et al. |
| 2007/0094594 A1 | 4/2007 | Matichuk et al. |
| 2007/0121937 A1 | 5/2007 | Kochevar et al. |
| 2007/0152841 A1 | 7/2007 | Eren et al. |
| 2007/0156659 A1 | 7/2007 | Lim |
| 2007/0183000 A1 | 8/2007 | Eisen et al. |
| 2007/0226014 A1 | 9/2007 | Alemayehu et al. |
| 2007/0254676 A1 | 11/2007 | Pedigo et al. |
| 2007/0275735 A1 | 11/2007 | Estevez |
| 2008/0002911 A1 | 1/2008 | Eisen et al. |
| 2008/0011850 A1 | 1/2008 | Henry |
| 2008/0041942 A1 | 2/2008 | Aissa |
| 2008/0109099 A1 | 5/2008 | Moshier |
| 2008/0143482 A1 | 6/2008 | Shoarinejad et al. |
| 2008/0148059 A1 | 6/2008 | Shapiro |
| 2008/0239365 A1 | 10/2008 | Salgado et al. |
| 2008/0272881 A1 | 11/2008 | Goel |
| 2008/0307503 A1 | 12/2008 | Waters |
| 2009/0085745 A1 | 4/2009 | Gupta et al. |
| 2009/0089206 A1 | 4/2009 | Lukac |
| 2009/0121897 A1 | 5/2009 | Muhlethaler et al. |
| 2009/0144619 A1 | 6/2009 | Best et al. |
| 2009/0150442 A1 | 6/2009 | Barnard et al. |
| 2009/0289443 A1 | 11/2009 | Okezie |
| 2009/0296166 A1 | 12/2009 | Schrichte |
| 2009/0321517 A1 | 12/2009 | Deane et al. |
| 2010/0033753 A1 | 2/2010 | Stephenson |
| 2010/0046015 A1 | 2/2010 | Whittle et al. |
| 2010/0070396 A1 | 3/2010 | Schrichte |
| 2010/0123003 A1 | 5/2010 | Olson et al. |
| 2010/0241844 A1 | 9/2010 | Hussain et al. |
| 2011/0001604 A1 | 1/2011 | Ludlow et al. |
| 2011/0142295 A1 | 6/2011 | Mandelbaum et al. |
| 2011/0145053 A1 | 6/2011 | Hashim-Waris |
| 2011/0221565 A1 | 9/2011 | Ludlow et al. |
| 2012/0024948 A1 | 2/2012 | Messina |
| 2012/0117045 A1 | 5/2012 | Carlock |
| 2012/0330838 A1 | 12/2012 | Hoffman et al. |
| 2013/0024239 A1 | 1/2013 | Baker et al. |
| 2013/0040657 A1 | 2/2013 | Jackson |
| 2013/0185240 A1 | 7/2013 | Ward et al. |
| 2013/0214044 A1 | 8/2013 | Sperduti et al. |
| 2014/0056486 A1 | 2/2014 | Mandelbaum et al. |
| 2014/0059188 A1 | 2/2014 | Linden et al. |
| 2014/0115710 A1 | 4/2014 | Hughes et al. |
| 2015/0012305 A1 | 1/2015 | Truskovsky et al. |
| 2015/0200922 A1 | 7/2015 | Eschbach et al. |
| 2016/0125680 A1 | 5/2016 | White et al. |
| 2016/0358171 A1 | 12/2016 | Gannon |
| 2017/0126784 A1 | 5/2017 | Mattern |

FOREIGN PATENT DOCUMENTS

| | | |
|---|---|---|
| DE | 4410459 A1 | 2/1995 |
| DE | 19527737 | 6/2006 |
| EP | 0187448 A2 | 7/1986 |
| EP | 0407207 A3 | 7/1991 |
| EP | 0683471 A1 | 11/1995 |

(56) References Cited

FOREIGN PATENT DOCUMENTS

| | | |
|---|---|---|
| EP | 0991027 A2 | 4/2000 |
| FR | 2571873 A1 | 4/1986 |
| GB | 1546053 | 1/1978 |
| GB | 2067322 | 10/1984 |
| GB | 2136180 B | 2/1985 |
| GB | 2270586 A | 3/1994 |
| GB | 2332973 A | 7/1999 |
| GB | 2359172 B | 2/2004 |
| JP | 0050075879 | 6/1975 |
| JP | 63138462 | 6/1988 |
| JP | 64055695 | 3/1989 |
| JP | 7093648 | 4/1995 |
| JP | 0080101868 | 4/1996 |
| JP | 09245231 | 9/1997 |
| JP | 11316818 | 11/1999 |
| JP | 3100972 B2 | 10/2000 |
| JP | 2003157615 A | 5/2003 |
| WO | WO8702491 A1 | 4/1987 |
| WO | WO9412372 | 6/1994 |
| WO | WO9422371 A2 | 10/1994 |
| WO | 0213049 A1 | 2/2002 |
| WO | WO02095589 A1 | 11/2002 |

OTHER PUBLICATIONS

*Honeywell International Inc.* v. *Intellicheck Mobilisa, Inc*, PTAB-CBM2017-00062, CBM review of patent owned by common assignee, initiated Jul. 28, 2017, documents filed Jul. 28, 2017.

*Honeywell International Inc.* v. *Intellicheck Mobilisa, Inc*, PTAB-CBM2017-00062, CBM review of patent owned by common assignee, initiated Jul. 28, 2017, documents filed Aug. 14, 2017 through Aug. 31, 2017.

*Honeywell International Inc.* v. *Intellicheck Mobilisa, Inc*, PTAB-CBM2017-00062, CBM review of patent owned by common assignee, initiated Jul. 28, 2017, documents filed Oct. 18, 2018.

*Honeywell International Inc.* v. *Intellicheck Mobilisa, Inc*, PTAB-CBM2017-00062, CBM review of patent owned by common assignee, initiated Jul. 28, 2017, documents filed Oct. 27, 2017.

*Honeywell International Inc.* v. *Intellicheck Mobilisa, Inc*, PTAB-CBM2017-00062, CBM review of patent owned by common assignee, initiated Jul. 28, 2017, documents filed Oct. 30, 2017.

Kim et al. 'Experiences with Tripwire: Using Integrity Checkers for Intrusion Detection', In Systems Administration. Networking and Security Conference III (Usenix, 1994 [online]). Published Feb. 21, 1994. [retrieved on Dec. 18, 2008]. Retrieved from the Internet.

\* cited by examiner

*FIG. 7*

```
ID – Traveler (TM)                                                    [X]
File  Data  Help
┌──────────┐ ┌─ Status ──────────────────────────────────┐ ┌──────────┐
│Processing│ │   Ready for document.                     │ │Clear Data│
│   [icon] │ │   NO FIELDS TO COMPARE                    │ └──────────┘
│  Process │ └───────────────────────────────────────────┘
│          │ ┌─ Document 1 ──────────┐ ┌─ Document 2 ──────────┐
│          │ │ Benefit Card          │ │ Credit Card           │
│          │ │  Issued By: Demo State│ │  Issued By: Master Card│
│          │ │  Document #: 9899991234567890 │ │ Document #: 5471381234567890 │
│          │ │  Issue Date:          │ │  Issue Date:          │
│          │ │    Exp Date: 09/30/2010│ │   Exp Date: 01/31/2010│
│          │ │     Expired: No       │ │    Expired: No        │
│          │ │ Date of Birth:        │ │ Date of Birth:        │
│          │ │        Name:          │ │        Name: Public, John│
│          │ │     Address:          │ │     Address:          │
│          │ │        City:          │ │        City:          │
│          │ │  State/Prov:          │ │  State/Prov:          │
│          │ │ Postal Code:          │ │ Postal Code:          │
│          │ │      Gender:          │ │      Gender:          │
│          │ │  Hair Color:          │ │  Hair Color:          │
│          │ │   Eye Color:          │ │   Eye Color:          │
│          │ │ Weight (lbs):         │ │ Weight (lbs):         │
│          │ │ Height (ft/in):       │ │ Height (ft/in):       │
│          │ │  Nationality:         │ │  Nationality:         │
│ History  │ │ Option Date:          │ │ Option Date:          │
│  Setup   │ │   CheckDigit:         │ │   CheckDigit:         │
└──────────┘ └───────────────────────┘ └───────────────────────┘
```

SYSTEMS AND METHODS FOR COMPARING DOCUMENTS

CROSS-REFERENCE TO RELATED APPLICATION(S)

This application is a continuation of U.S. patent application Ser. No. 16/149,067 filed Oct. 1, 2018, entitled "SYSTEM AND METHOD FOR COMPARING DOCUMENTS", which application is a continuation application of U.S. patent application Ser. No. 15/343,583, filed Nov. 4, 2016, entitled "SYSTEM AND METHOD FOR COMPARING DOCUMENTS", which is a continuation application of U.S. patent application Ser. No. 14/606,468, filed Jan. 27, 2015, entitled "SYSTEM AND METHOD FOR COMPARING DOCUMENTS", which is a continuation application of U.S. patent application Ser. No. 14/256,260, filed Apr. 18, 2014, now U.S. Pat. No. 8,942,432, entitled "SYSTEM AND METHOD FOR COMPARING DOCUMENTS" which is a continuation application of U.S. patent application Ser. No. 14/011,512, filed Aug. 27, 2013, now U.S. Pat. No. 8,705,807, entitled "SYSTEM AND METHOD FOR COMPARING DOCUMENTS", which is a continuation application of U.S. patent application Ser. No. 13/411,117, filed Mar. 2, 2012, now U.S. Pat. No. 8,520,957, entitled "SYSTEM AND METHOD FOR COMPARING DOCUMENTS", which is a continuation application of U.S. patent application Ser. No. 12/944,615, filed Nov. 11, 2010, now U.S. Pat. No. 8,139,869, entitled "SYSTEM AND METHOD FOR COMPARING DOCUMENTS", which is a continuation application of U.S. patent application Ser. No. 10/984,703, filed Nov. 9, 2004, now U.S. Pat. No. 7,860,318, entitled "SYSTEM AND METHOD FOR COMPARING DOCUMENTS", all of the contents of which are incorporated herein by reference in their entireties.

TECHNICAL FIELD

The present invention generally relates to an identification system for documents. More particularly, the present invention relates to a system and method for comparing information on at least two documents. Such comparison may be performed to verify an entity's identity.

DESCRIPTION OF THE PRIOR ART

The problem of rampant and readily available fake identification documents, more particularly, driver licenses and other identification documents, has caused many retailers fines, sometimes imprisonment, loss of tobacco and liquor licenses, and has even subjected them to other forms of civil and criminal liability. Over the course of years, various attempts have been made to prevent or detect the use of fake identification documents, but not with a great deal of success. To help prevent the use of fake identification documents, motor vehicle authorities have been working on and refining a comprehensive framework of minimum requirements with recommendations to enhance and improve the security and uniformity of driver license documents in North America. These new driver licenses and other identification documents have embedded coded, or even encrypted coded information, with machine readable formats that conform to various standards.

The use of driver licenses has expanded over the years to serve as identification for various applications, such as for the purchase of alcohol, tobacco or lottery products, as well as for gambling in casinos, off-track betting (OTB), movie theaters and user-definable events, such as allowing the ingress into liquor establishments. All of these fields have an age requirement for the purchase of a product at the point-of-transaction or for ingress into an establishment and the driver license is the document used to provide age identification and all age verification is commonly accomplished in a relatively quick manner.

To prevent use of false identifications, sometimes two forms of identification are used to verify a person's identity. Such situations typically occur in government applications that require multiple forms of identification before the issuance of a government credential or ID. Upon a visual examination, the documents (e.g., a passport and a driver's license) may look identical. However, the information encoded on the documents may be different. Similarly, a cashier during a sale transaction may request a person's driver's license to verify some information on a credit card, which is used to pay for a purchase. Other situations may involve use of government and non-government identification cards in various identity verification scenarios. Thus, there is a need for a system and a method that will compare information encoded on documents in order to verify contents of the documents against each other and, hence, to verify an entity's identity.

SUMMARY

The present invention relates to a system and a method for comparing information contained on at least two documents belonging to an entity. The present invention includes at least one device configured to receive information from at least one first document and at least one second document; then, compare at least one first document information and at least one second document information; and determine whether at least one second document contains at least one first document information.

In an alternative embodiment, the present invention is a method for comparing documents on a device. The method includes steps of receiving information from at least one first document and at least one second document; comparing the information from the at least one first document to the information from the at least one second document; and determining whether the at least one second document contains the at least one first document information.

In yet another embodiment, the present invention is a method for comparing information contained on an entity's identification documents. The method includes steps of extracting information contained on the entity's identification documents; comparing information extracted from the entity's identification documents; and determining if at least one extracted information is contained on all entity's identification documents.

Further features and advantages of the invention, as well as structure and operation of various embodiments of the invention, are disclosed in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 7 is yet another output screen illustrating a comparison between selected documents' information fields, according to the present invention.

DETAILED DESCRIPTION

The present invention relates to a system and a method for comparing documents within a computer terminal. In an embodiment, the present invention reads information from a first document. The information can be read using a card reader, a magnetic reader; a bar code reader, a scanner or any other reader capable of obtaining information from the document. Once read, the present invention extracts the information into certain document fields. In this embodiment, the fields are first name, last name, middle initial, date of birth, social security number, driver license number, address, state of issuance of the document, date of issuance of the document, etc. As can be understood by one having ordinary skill in the relevant art, the fields and a number of them are not limited to the ones defined above.

The present invention then reads the second document in a similar fashion. The second document may belong to the same entity, which presented the first document. However, the second document is different from the first document. For example, the first document is a driver license and the second document is a passport. In another example, the first document is a credit card and the second document is a government issued identification card.

The present invention also extracts information obtained from the second document in a similar fashion as it does with the first document. Then, the present invention determines which first document fields and which second document fields contain identical or substantially identical information or type of information. For example, a first document field having "name of entity" and a second document also having the "name of entity" are compared. Similarly, other document fields can be compared. If any or all document fields in the documents contain similar information, then the present invention indicates a "match" signal. If not, then the present invention issues a "no match" signal. In an alternate embodiment, the present invention determines whether the documents contain information that is also contained on the other document. For example, a first document's name field contains the same information as is contained in a second document's name field (such as, "John Doe" is contained in the first document's name field and "John Doe" is also contained in the second document's name field).

Figure 1:
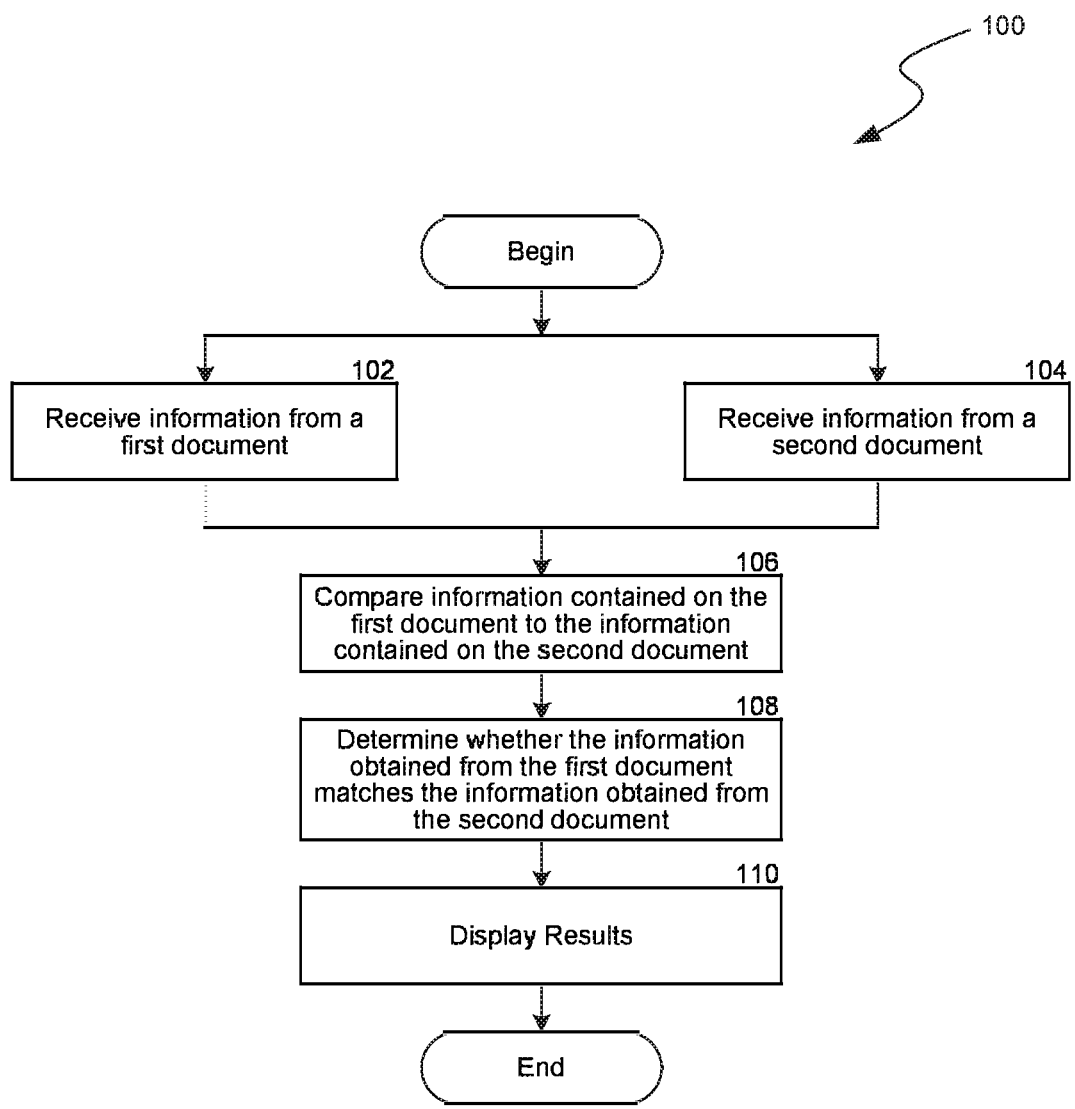
FIG. 1 illustrates an exemplary method of comparing documents on a terminal device, according to the present invention.

Embodiments of the present invention are described with respect to FIGS. 1-7. FIG. 1 illustrates an embodiment of the present invention's method 100 for comparing documents on a terminal device. The method 100 is performed by a system 300 shown in FIGS. 3*a* and 3*b*.

Figure 3A:
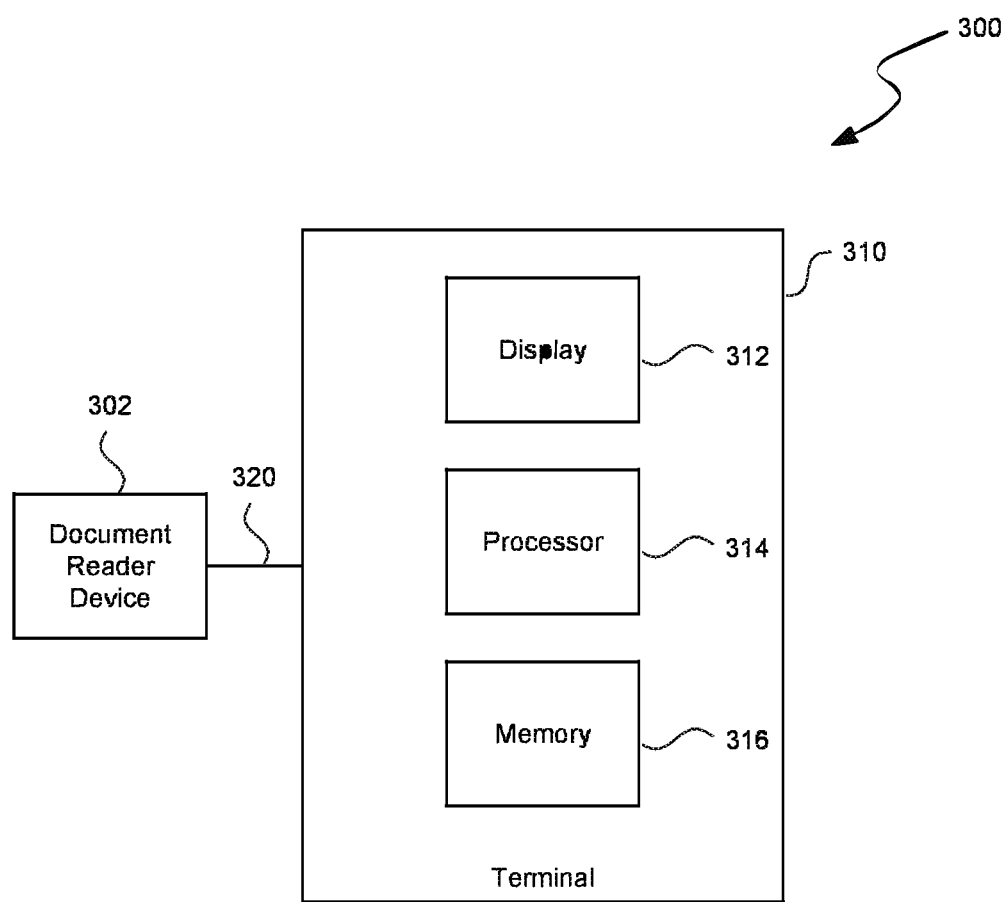
FIG. 3A illustrates an exemplary apparatus for comparing documents on a terminal device, according to the present invention.

Referring to FIG. 3*a*, system 300 includes a document reader device 302 coupled to a terminal 310 via a connection 320. The terminal 310 further includes a display 312, processor 314 and a memory 316. The document reader device 302 can be a single device capable of retrieving information from a document. In an alternate embodiment, the document reader device 302 can be a collection of devices that retrieve information from documents. The document reader device 302 can be a bar code reader, a magnetic stripe reader, a smart card reader, a scanner, a laser reading device, a RFID device, an optical scanner or any other device capable of retrieving information contained on a document. Further, in an embodiment, a single document reader device 302 can retrieve information from various types of documents (e.g., a driver's license and a passport). In an alternate embodiment, separate document reader devices 302 can be used for retrieving information from different types of documents. The document can be a driver license, a credit card, a passport, a visa document, a green card, a government issued identification card, a non-government issued identification card, a military identification card, or any other document containing information, whether or not in a coded form. As can be understood by one having ordinary skill in the relevant art, the present invention is not limited to document reading devices as well as the types of documents described above.

Further, the connection 320 can be an electrical, electro-mechanical, wireless, or any other connection suitable for transferring information from the document reader device 302 to the terminal 310. The document reader device 302 can also be part of the terminal 310.

In an embodiment, the terminal 310's display 312 serves to display information relating to a read document. Some of the outputs of the display 312 are shown in FIGS. 4-7 and described below. The processor 314 processes information obtained from the read document. In an embodiment, the processor 314 performs method steps described in FIGS. 1-2 below. The processor 314 can further be coupled to the display 312 and the memory 316. After processing information received from the document reader device 302, the processor 314 can store the information in the memory 316, as well as, cause the display 312 to display the processed information. The memory 316 can be terminal's 310 permanent memory, random access memory, read only memory, or other type of storage device capable of either permanently, temporarily, or permanently and temporarily store information. The content of memory 316 can be altered by adding, deleting, or changing the stored information in any other way. The stored content can be recalled by the processor 314 and outputted on the display 312, upon request or otherwise. In an alternate embodiment, the content of the memory 316 can be password-protected.

Figure 3B:
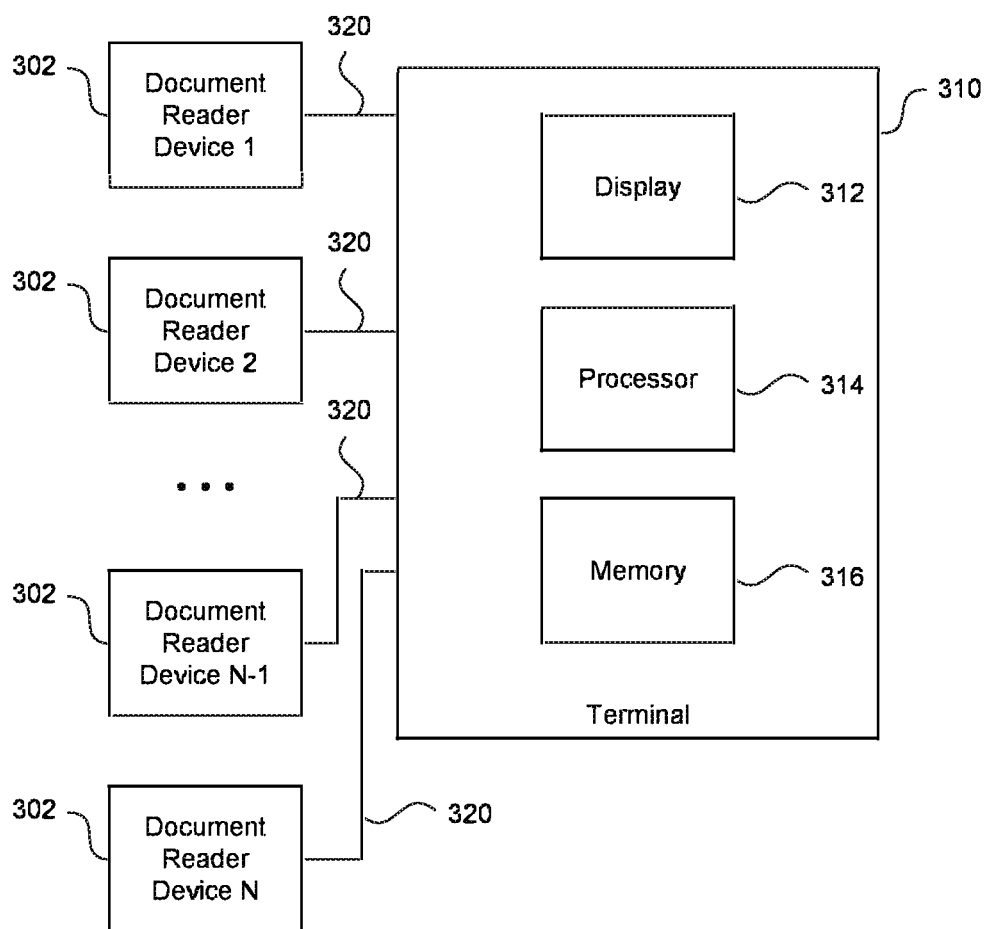
FIG. 3B illustrates another exemplary apparatus for comparing documents on a terminal device, according to the present invention.

In an alternate embodiment, as shown in FIG. 3*b*, the terminal 310 can be coupled to a plurality of document reader devices N (where N is an integer) 302 via connections 320. The document reader devices 302 can be a plurality of devices such as those referred to above. Similarly, each document reader device 302 out of the plurality of document reader devices can be designed to retrieve information from multiple types of documents. Alternatively, each document reader devices can retrieve information only from a specified type of document.

Referring to FIG. 1, an exemplary embodiment of the method 100 for comparing information contained on at least two documents begins with steps 102 and 104. The two steps can be performed simultaneously or one after the other. In step 102, the document reader device 302 reads the information from a first document. In step 104, the document reader device 302 reads information from a second document. For example, the first document can be a person's driver license, which contains information about person's first name, last name (or a combination of first and last names, as well as any middle initials, suffixes, and other name designations), address, date of birth, issuing jurisdiction, eye color, hair color, and other pertinent information identifying the individual.

The second document can be a person's passport. For example, a U.S. passport includes a Machine Readable Zone ("MRZ") in its laminated portion. The passport's MRZ typically encodes the person's first name, last name (or a combination of first and last names), date of birth, country of origin, and other relevant information. Optical Character Recognition ("OCR") is used to retrieve information from the passport. In an embodiment, the document reader device 302 can be designed to retrieve information from a passport's MRZ using OCR.

The driver license and the passport can be passed through the document reader device 302 to gather information. In an embodiment, a single document reader device 302 can be designed to be able to retrieve information from the passport and the driver license, as well as other types of documents. In an alternate embodiment, separate document reader devices 302 can be used to retrieve information from different types of documents. By passing the documents through the document reader device 302, the information contained on the documents is detected and read by the device 302. In an embodiment, the device 302 can read the documents simultaneously. In other words, the documents can be passed through the device 302 at the same time (assuming the device 302 includes more than one reader). In an alternate embodiment, the documents can be read one after the other. In this case, the documents can be passed through different readers corresponding to different types of documents or through a single reader designed to read multiple types of documents.

The processing then proceeds to step 106. In step 106, the method 100 compares the information received from the first document to the information obtained from the second document. In the above example, the information obtained from a driver license is compared to the information obtained from an individual's passport. In an embodiment, the system 300 can compare the person's first name, last name (or a combination of first and last names), and date of birth as obtained from the driver's license and the passport. Other present invention's systems are capable of comparing an individual's middle initial/name and/or gender in addition to and/or in combination with the above information. In alternate embodiments, the documents can contain various other information that cannot be easily compared. For example, if the driver license is compared to a credit card, the credit card's number cannot be compared to any information contained of the driver license. However, the documents typically will contain person's first and last names (or a combination of first and last names), as well as his or her date of birth. As can be understood by one having ordinary skill in the relevant art, the present invention is not limited to comparison of the person's first name, last name (or a combination of the first and last names), and date of birth as stored by the documents. Other embodiments of the present invention include comparison of information relating to person's address, gender, hair color, eye color, social security number, and other information. Further, depending on the type of document and type of information stored on the document's readable medium (e.g., magnetic stripe, bar code, etc.), appropriate comparisons can be made by the system 300 using method 100.

In step 108, the system 300 determines if any of the information obtained from the first document is identical or substantially identical to the information obtained from the second document. In the example of the driver's license and the passport, the system 300 would determine if the person's first name obtained from the driver's license is identical or substantially identical to the person's first name obtained from the passport. In an embodiment, the system 300 is designed to read and compare a combination of the individual's first name, last name, middle initial, and/or any other information (e.g., gender) on the first document (e.g., driver's license) to a combination of the individual's first name, last name, middle initial, and/or any other information on the second document (e.g., passport).

Similar comparisons can be made for the person's last name and data of birth. The processor 314 is designed to read information from documents coded in various formats. For example, if the person's date of birth is stored as 10/01/1946 on the driver license and the same date of birth is stored on the person's passport as 01/10/46 (assuming the date is placed first and month placed second), the system 300 would read it as Oct. 1, 1946. Likewise, the system 300 is capable of reading other information in a similar fashion.

Additionally, the system 300 can be set up so that it is able to do a partial match of the person's names. For example, if the first document has "Charles" as the person's first name and the second document has "Chuck" as the person's first name, the system can determine that the two documents contain identical information or that the documents contain each other's information in respective fields. However, for added security such comparison may be insufficient. Hence, some additional information is needed to verify person's identity based on the two documents. In embodiments requiring greater security, information obtained from the first document must be identical to the information obtained from the second document. That is, if the person's first name, last name, and date of birth are used to compare the documents, then all three must be respectively identical on both documents.

In an embodiment, in step 110, the system 300 can provide an output showing whether the information obtained from the first document is identical or substantially identical information obtained from the second document. For example, a "Match" is displayed on display 312, if the information used to compare the two documents is identical for both documents. Alternatively, the system 300 displays "Match" on the display 312, if it determines that the documents contain each other's respective information. A "No Match" is displayed on display 312, if the information is not identical. Further, if the system 300 determines that the documents does not contain information that can be compared, it displays an error signal. As can be understood by one having ordinary skill in the relevant art, other indicators can be used to determine whether the information is identical or not. In an embodiment, the indicators can include sounds, LED indicators, and other ways to determine how the information on the documents compare.

Figure 2:
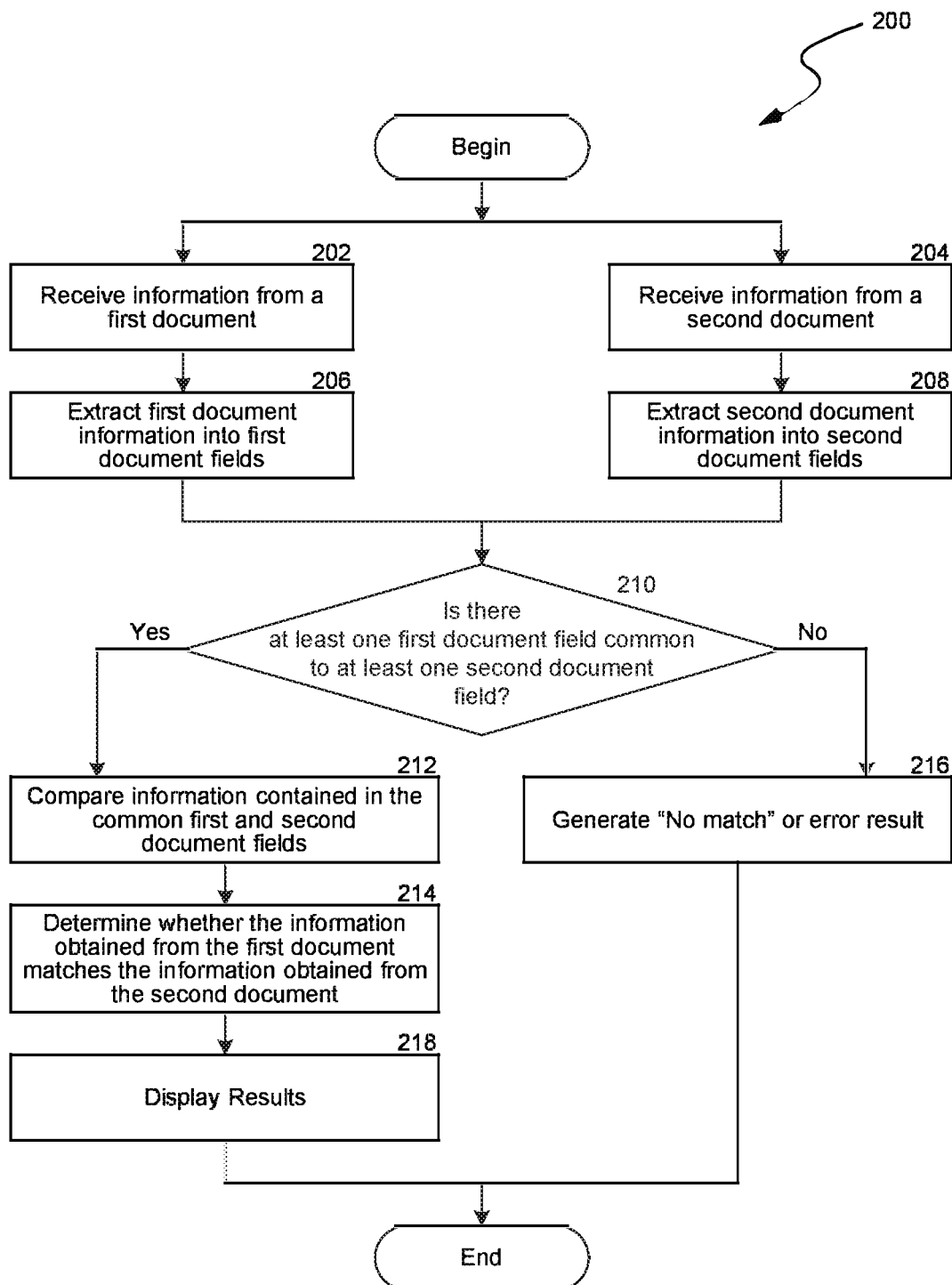
FIG. 2 illustrates another exemplary method of comparing documents on a terminal device, according to the present invention.

FIG. 2 illustrates another exemplary method 200 for comparing information on at least two documents, according to the present invention. Method 200 can also be performed by the system 300 shown in FIGS. 3a and 3b. Method 200 begins with steps 202 and 204. In steps 202 and 204, the system 300 reads information from the first and second documents, respectively. These steps are similar to steps 102 and 104, described above with respect to FIG. 1.

After steps 202 and 204, the processing proceeds to steps 206 and 208, respectively. In step 206, the system 300 extracts information from the first document. In an embodiment, the system 300 extracts person's first name, last name (or a combination of first and last names), and date of birth. In an alternate embodiment, the system 300 can extract other information that identifies the person.

Similarly, in step 208, the system 300 extracts information from the second document. As with the first document, the system 300 extracts person's first name, last name (or a combination of the first and last names), and date of birth. If other information is used to compare the documents, then system 300 extracts the appropriate information.

In an embodiment, the system 300 extracts document information into document fields. For example, the person's first name extracted from the first document is stored in a first document's first name field; the person's last name extracted from the first document is stored in a first document's last name field; and so on. The process is similar for the second document, which includes second document fields. Exemplary fields are shown in FIGS. 4-7. In an embodiment, the system 300 can read the following fields: first name, last name (or a name, i.e., a combination of first and last names), document number, issuer's information, expiration date, address, hair color, gender, eye color, weight, and others. Depending on the document type, certain information may or may not be extracted. This is because the information is either contained on the document or not. As can be seen from FIGS. 4-7, an individual driver's license contains information fields different from an individual's financial document, such as a credit card. Similar situation exists with respect to an individual's passport (FIG. 5) or military identification card (FIG. 6) or a benefit card (FIG. 7). As can be understood by one having ordinary skill in the relevant art, other documents can include various other information fields that identify the individual. The extracted information can be stored in memory 316. As stated above, the content of the memory 316 can be accessed later on.

The processing then proceeds to step 210. In step 210, the system 300 determines whether there are any common information fields between two documents. For example, if an individual's driver's license and passport are compared, then the system 300 determines that the first name, the last name, and the date of birth information fields are common to both documents. In an embodiment, a combination of the individual's first and last names can be compared. As stated above, other parameters, such as an individual's middle initial, gender, or other information can be used to compare the two documents in addition to or in combination with the above information. In another example, if an individual's driver license is compared to a credit card, then the two documents have common name information fields.

If the system 300 determines that the documents have at least one common information field or field type, e.g. the first and second documents contain first name, last name (or a combination of first and last names), and date of birth information fields, then the processing proceeds to step 212. Also, as stated above, in an embodiment, the individual's other parameters (e.g., middle initial, gender, etc.) can be compared along with the above information. In step 212, the system 300 compares the information in the common information fields. Then, in step 214, the system 300 determines whether the information contained in the common information fields of both documents is identical or substantially identical. If greater security is required, then the information must be identical. For example, if name field is common to both documents, the data contained in this field for both documents must be identical (i.e., if John Doe is contained in the first document's name field, then John Doe must be contained in the second document's name field, in order for the information to be identical). The system 300 performs this determination based on the comparison done in step 212. If the fields in the first and second documents contain identical or substantially identical information, then the system 300 can issue a signal indicating that the documents contain such information in respective document fields. For example, the system 300 can issue a "Match" signal if the documents have identical or substantially identical information in respective document fields. As stated above, depending on the desired level of security, the system can issue a "Match" signal even if the documents contain information that is partially identical. In an embodiment, this signal can be displayed on the screen 312, as shown in step 218.

However, if the document's common document fields do not have identical or substantially identical information, then the system 300 issues an alert. The alert indicates the documents do not have any identical or substantially identical information in the respective common document fields. In an embodiment, the alert can be a "No Match" signal displayed on the screen 312.

In an event, that there are no common document information fields in the documents, the system 300 issues an error signal indicating that there is no match or that there are no common information fields. This is shown in step 216 of method 200.

The system 300 is capable of performing exemplary methods 100 and 200 for multiple documents at the same time or sequentially. As can be understood by one having ordinary skill in the relevant art, the above are exemplary embodiments that do not limit the scope of the present invention.

FIGS. 4-7 illustrate comparisons between various documents, which system 300 performed.

Figure 4:
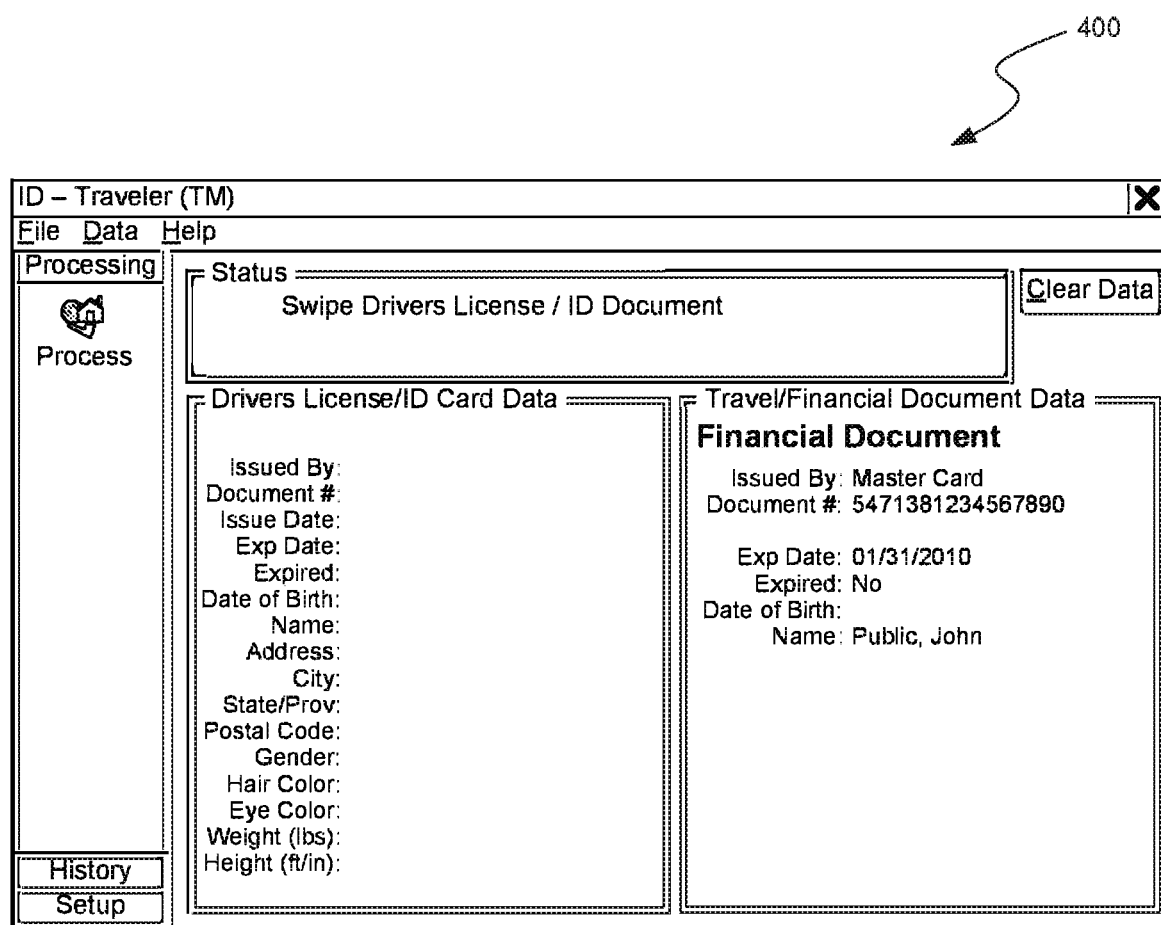
FIG. 4 is an output screen illustrating a plurality of identification documents' information fields, according to the present invention.

FIG. 4 illustrates a screen output 400 showing a Master Card credit card being scanned in by the system 300. The system 300 indicates that the credit card is a financial document, shows its number, expiration date, whether it expired, and the name of the bearer. Because no other document is scanned, in the status window, the system 300 indicates that another document needs to be scanned before a comparison can be performed. Hence, one of the document columns in FIG. 4 is left blank.

Figure 5:
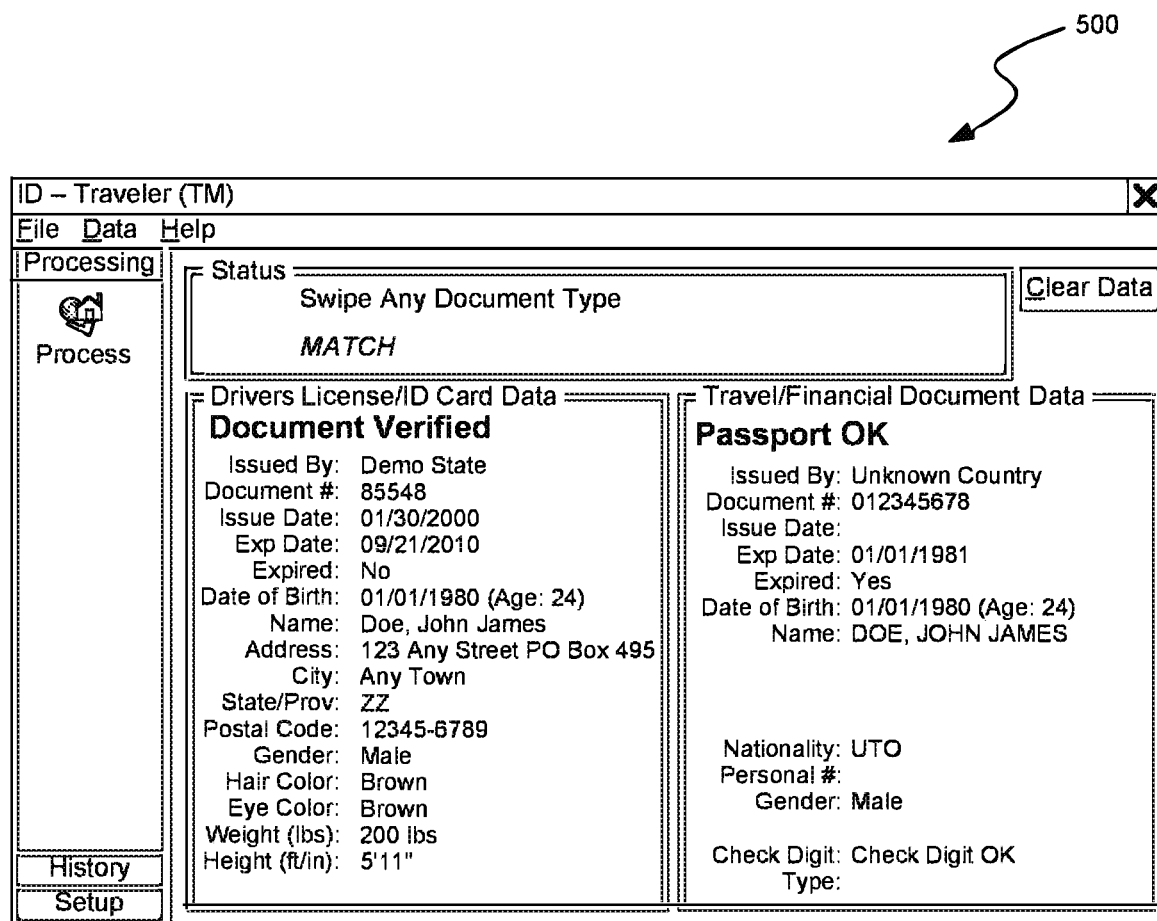
FIG. 5 is an output screen illustrating a comparison between selected documents' information fields, according to the present invention.

FIG. 5 illustrates another screen output 500 showing a driver's license and a passport of an individual being compared by system 300. The left column of the screen output 500 indicates data obtained from the driver's license. This data was extracted into various document fields, such as: name, date of birth, address, city, document number, issue date, etc. The right column of the screen output 500 indicates data read from that individual's passport. Likewise, the data was extracted into various document fields, such as: name, document number, date of birth, expiration date, etc. Both columns also indicate types of documents. In this example, the system 300 determined that the information in the "NAME" and "DATE OF BIRTH" fields was identical on both documents. Hence, the system issued a match signal, as indicated in the status window of the screen output 500. As can be understood by one having ordinary skill in the relevant art, other types of information (e.g., gender, address, etc.) can be used to compare the above documents. In an embodiment, the data obtained the individual's driver's license is displayed in the left column, whereas other documents are displayed in the right columns.

Further, each column on the screen output has a designation type, e.g., the left column is entitled "Driver's License/ID Cards Data" and the right column is entitled "Travel/Financial Document Data." However, as can be understood by one having ordinary skill in the relevant art, the present invention is not limited to these designations. Further, as can be understood by one having ordinary skill in the relevant art, the system in the present invention is not limited to displaying information retrieved from specific documents in either left or right columns. For example, the "Driver's License/ID Cards Data" can be placed in either right or left columns. Similar situation exists with respect to other types of documents' information.

Also, the status window may include textual and other types of indicators characterized by color, sound alert, flashing banner, text size and/or font, as well as other ways to indicate whether documents include identical or substantially identical information. For example, if the documents contain identical or substantially identical information, system 300 can display the word "MATCH" in green color as well as italicizing and bolding the word. If the system 300 determines that the documents do not include identical or substantially identical information, it can display an indicator in red, as well as, sound an alert.

Figure 6:
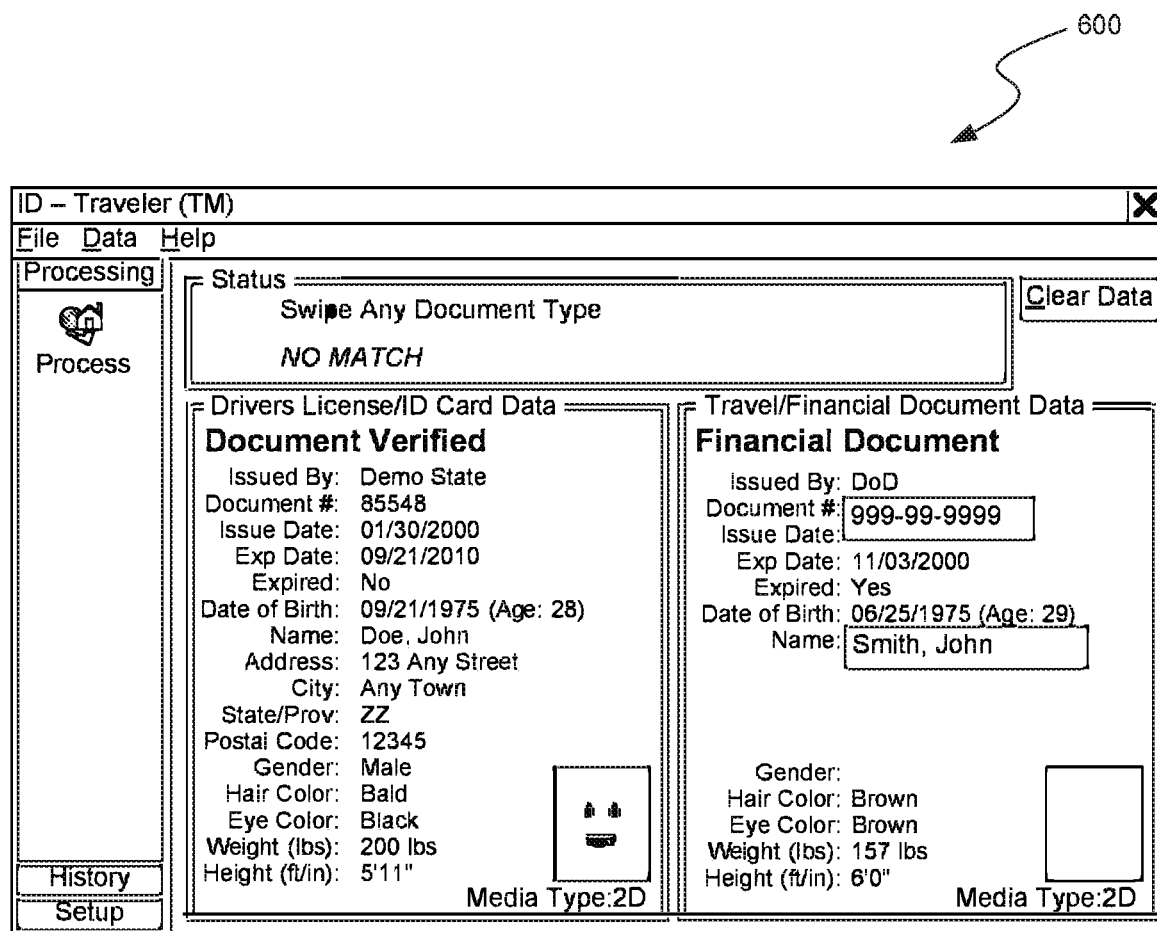
FIG. 6 is another output screen illustrating a comparison between selected documents' information fields, according to the present invention.

FIG. 6 illustrates another screen output 600 produced by the system 300 after comparing two documents. In this example, the system 300 compared an individual's driver's license and Department of Defense document. Here, no identical or substantially identical information was found, even though common document fields existed (such as name and date of birth fields). Hence, the system 300 displayed a "NO MATCH" signal in its status window.

FIG. 7 illustrates yet another screen output 700 produced by the system 300 after comparing a benefit card and a credit card. In this example, no common identification fields that contain information were found. The benefit card, shown in the left column, contains four fields: issuing jurisdiction designation, card number, expiration date, and whether the card expired or not. The credit card, shown in the right column, contains five fields: issuing entity, card's number, expiration date, whether the card expired or not, and bearer's name. Because system 300 did not find any common document fields in the documents, it displayed an error signal indicating that there were no fields to compare. As stated above, such signal can be displayed in various colors, text size and/or font, and others. If desired, the error can be accompanied by a sound.

Further, as seen from FIGS. 4-7, the system 300 is capable of comparing entity's identification characteristics (i.e., name, date of birth, address, etc.) as well as comparing identifying biometric parameters. The biometric parameters may include entity's picture, gender, fingerprints, DNA information, blood type, eye color, hair color, weight, height, etc.

Example embodiments of the methods and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

We claim:

1. A system for comparing documents, comprising:
at least one document reader configured to:
read a first portion of information from at least one ID document during a transaction;
read a second portion of information from at least one travel document during the transaction;
compare the first portion of information and the second portion of information;
determine whether the first portion of information and the second portion of information contain a match; and
generate a match indication based on the determination.

2. The system of claim 1, wherein the at least one document reader comprises a card reader, a magnetic reader, a bar code reader, an information retriever, a smart card reader, a laser reader, an RFID reader, an optical reader, or a scanner.

3. The system of claim 1, wherein the at least one ID document comprises at least one of: a driver's license, a visa document, a green card, a passport, a military identification, a government issued identification, or a non-government issued identification.

4. The system of claim 1, wherein the at least one travel document comprises a non-government issued document.

5. The system of claim 1, wherein the at least one ID document or the at least one travel document is in electronic form.

6. The system of claim 1, wherein the first portion and the second portion are associated with a parameter describing a person, the parameter including at least a name of the person.

7. The system of claim 1, wherein at least some of the first portion of information or the second portion of information is at least one of embedded, coded, or encrypted.

8. The system of claim 1, wherein at least some of the first portion of information or the second portion of information are obtained from a machine readable zone, magnetic stripe, text, or a bar code.

9. The system of claim 1, wherein at least some of the first portion of information or the second portion of information are extracted from an image.

10. The system of claim 1, wherein at least some of the first portion of information or the second portion of information is recalled from memory and output via a display.

11. The system of claim 10, wherein the second portion of information is password-protected.

12. The system of claim 1, wherein the at least one travel document is temporarily valid.

13. The system of claim 1, wherein the at least one ID document or the at least one travel document include one or more biometric parameters, the one or more biometric parameters including at least one of a picture of the ID document holder, a gender, a fingerprint, DNA information, a blood type, an eye color, a hair color, a weight, or a height.

14. The system of claim 1, wherein the at least one document reader is further configured to:
analyze the first portion of information or the second portion of information to identify a format.

15. The system of claim 1, wherein the match is an identical match or an analogous match.

16. The system of claim 1, wherein the match indication comprises a color indication, a visual indication, or an audible indication.

17. A system for comparing documents, comprising:
at least one document reader configured to:
- read a first portion of information from at least one ID document and read a second portion of information from at least one payment account document during a single transaction;
- compare the first portion of information and the second portion of information;
- determine whether the first portion of information and the second portion of information contain a match; and
- generate a match indication based on the determination.

18. The system of claim 17, wherein the at least one payment account comprises a credit card account or financial document.

19. The system of claim 17, wherein the at least one ID document comprises at least one of: a driver's license, a visa document, a green card, a passport, a military identification, a government issued identification, or a non-government issued identification.

\* \* \* \* \*